Figure 1:
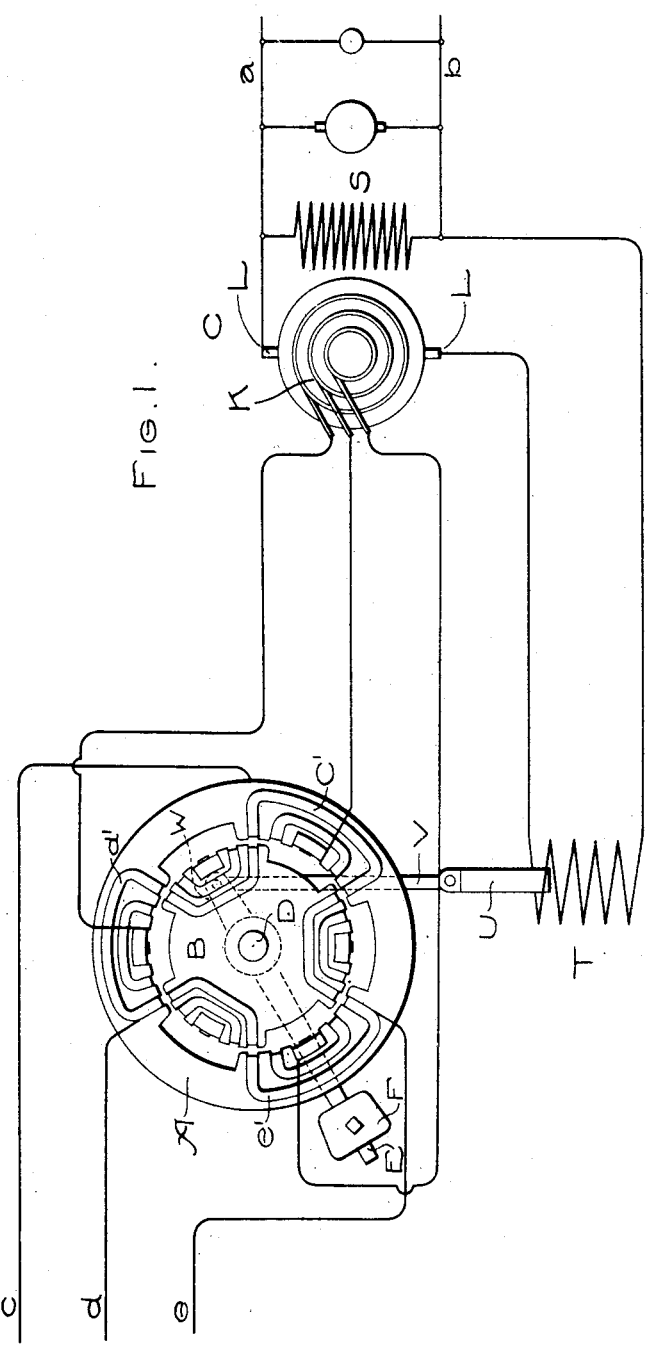

No. 712,991. Patented Nov. 4, 1902.
E. J. BERG.
REGULATING ROTARY CONVERTERS.
(Application filed Mar. 26, 1902.)
(No Model.) 2 Sheets—Sheet 1.

WITNESSES:
Harry H. Tilden
Helen Orford

INVENTOR:
Ernst J. Berg.
by Albert G. Davis
Att'y.

No. 712,991. Patented Nov. 4, 1902.
E. J. BERG.
REGULATING ROTARY CONVERTERS.
(Application filed Mar. 26, 1902.)
(No Model.)
2 Sheets—Sheet 2.

WITNESSES:
Harry H. Tilden
Helen Orford

INVENTOR:
Ernst J. Berg.
by Albert G. Davis
Att'y.

UNITED STATES PATENT OFFICE.

ERNST J. BERG, OF SCHENECTADY, NEW YORK, ASSIGNOR TO GENERAL ELECTRIC COMPANY, A CORPORATION OF NEW YORK.

REGULATING ROTARY CONVERTERS.

SPECIFICATION forming part of Letters Patent No. 712,991, dated November 4, 1902.

Original application filed March 20, 1899, Serial No. 709,804. Divided and this application filed March 26, 1902. Serial No. 100,054. (No model.)

*To all whom it may concern:*

Be it known that I, ERNST J. BERG, a citizen of the United States, residing at Schenectady, in the county of Schenectady, State of New York, have invented certain new and useful Improvements in Regulating Rotary Converters, (a division of my prior application, Serial No. 709,804, filed March 20, 1899,) of which the following is a specification.

In modern rotary-converter installations the regulation of the direct-current voltage is ordinarily effected by varying the field excitation of the converter. Such a variation of field excitation acts in a well-understood manner to vary the phase relations in the alternating-current system connected to the converter, and if the alternating-current system contains reactance the electromotive force at the alternating-current terminals may be made to rise or fall, as may be desired, and thus cause the direct-current voltage, which bears a definite relation to the electromotive force across the alternating-current terminals, to rise or fall correspondingly. The means ordinarily employed for varying the field excitation of the converter is a series field-winding supplied with current from the direct-current system connected to the converter. An increase of load on the converter thus acts to increase the field excitation, thus decreasing the amount of lagging current in the alternating system if the current be lagging or increasing the amount of leading current if the current be leading. If the alternating-current mains contain a sufficient amount of inductance, the electromotive force at the alternating-current terminals of the converter may be made to rise an amount sufficient to maintain a constant electromotive force at the direct-current terminals of the machine, or the rise in electromotive force may be made sufficient to secure an overcompounding effect on the direct-current system, as may be desired. Rotary converters when thus provided with series field-windings are open to several objections. The cost of such a machine is considerably more than that of a machine provided with a shunt field-winding only, while at the same time the machine with the series winding necessitates a more complicated and consequently more expensive arrangement of switchboard to be used in connection therewith. Another disadvantage of the compound-wound rotary converter is the troublesome manipulation required where machines are run in multiple. In addition to the connections necessary for the simple shunt-wound rotary converter under similar conditions a compound-wound machine requires equalizer connections which must be closed at the proper time and also in some cases it is necessary to provide switches in the German-silver adjusting resistances for the series winding. Because of these and other allied disadvantages I find it desirable in some instances to provide the rotary converter with a shunt-winding only and to secure the necessary regulation of the direct-current voltage by suitably varying the reactance in the mains or conductors over which the alternating current is supplied.

The particular method of varying the reactance in the alternating-supply mains depends upon the manner in which the field excitation of the converter is adjusted. If, for example, the field strength of the converter is such as to cause lagging current to flow in the alternating-supply mains, it is necessary to decrease the amount of reactance in the alternating mains in order to increase the electromotive force at the rotary-converter terminals, and so maintain the direct-current voltage either constant or variable with respect to the load, as may be desired. If, on the other hand, the current in the alternating-supply mains is made leading by means of overexcitation of the field of the converter or from other causes, it is necessary to increase the inductance in the alternating-supply mains with increase of load in order to secure the desired regulation of the direct-current system supplied by the converter.

In accordance with the mode of operation thus briefly outlined my invention, generally speaking, consists in regulating a rotary converter by automatically varying the reactance in the alternating-current system in a manner dependent upon the load on the rotary converter.

My invention will be more readily understood by reference to the following description, taken in connection with the accompanying drawings, while its scope will be clearly and particularly pointed out in the appended claims.

Figure 2:
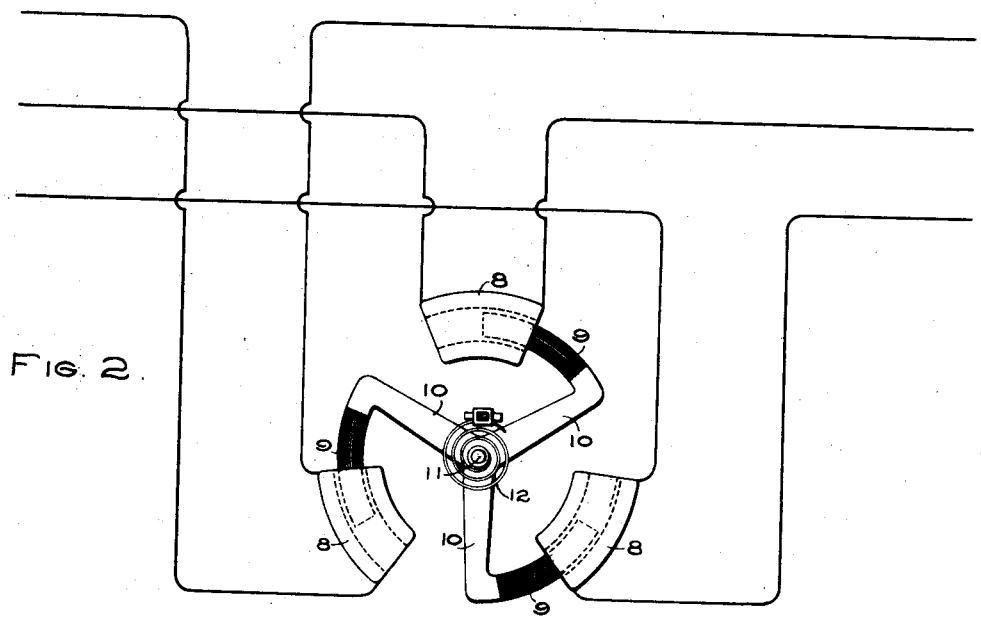
Figure 3:
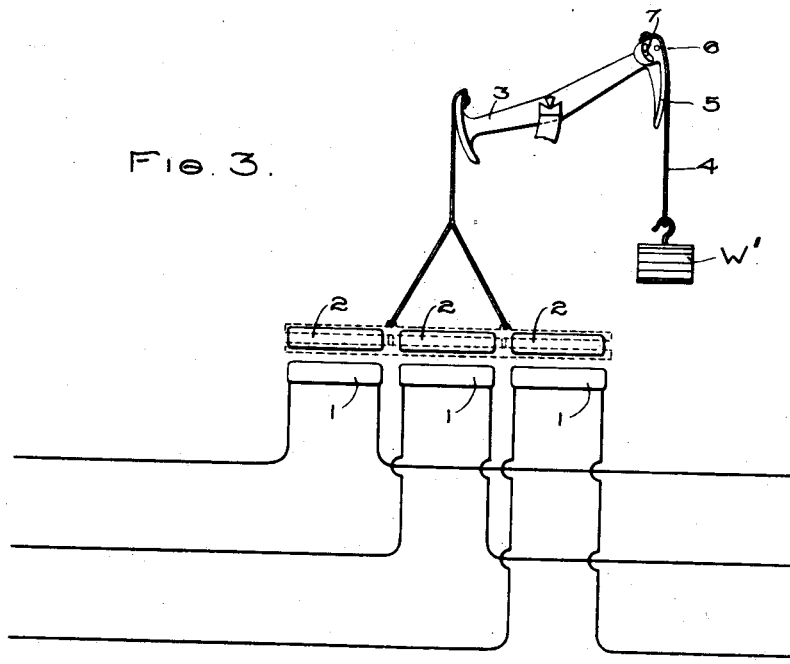

Figure 1 illustrates the application of my invention to a rotary-converter system in which the alternating currents are supposed to be lagging. Fig. 2 shows the inductance-varying device which is to be used in cases where the alternating currents are caused to be leading. Fig. 3 shows a different form of inductance-varying device.

Referring to Fig. 1, C indicates a rotary converter having the usual collector-rings K and commutator-brushes L. The field of the machine is excited by the shunt-winding S, connected across the direct-current mains $a\ b$. The translating devices of any suitable nature, such as motors or lights, are arranged to be fed from these direct-current mains.

The alternating-current mains over which energy is supplied to the converter are indicated at $c\ d\ e$ and in this case are shown as of the three-phase type, although it will be readily understood that any other phase relation, whether single phase or multiphase, may be employed. In order to vary the reactance in the alternating-current mains, I provide a device having relatively movable members and similar to an induction-motor. Upon one of the members (indicated in the drawings at A) a number of coils or sets of coils are wound equal in number to the number of alternating-current mains, and one of these coils is included in each main. In the structure shown the member A consists of a ring core having wound thereon three coils $c'\ d'\ e'$, displaced from each other by equal angles and included, respectively, in series with the alternating-current mains $c\ d\ e$. The relatively movable member B consists of a toothed core, of magnetic material, similar to the core of the rotor of an induction-motor. This core is provided with short-circuited coils displaced from each other by the same angles as the coils of the member A. The shaft D, carrying the member B, has mounted thereon a lever-arm E, provided with an adjustable weight F, the action of which produces a turning moment which tends to move the short-circuited coils away from the corresponding exciting-coils on the relatively rotatable member A. The function of the weight F is chiefly as a counterbalance for the weight of the core U and its connected parts and for the additional purpose of returning the movable member B to a fixed neutral position when no current is flowing in the system. In the position of the parts indicated in the drawings the lever E or some connected part is supposed to be resting against a stop, which is not here shown, this position corresponding to the position in which no current is flowing in the system.

In order to secure the desired relative motion between the two members of the inductance-varying device, I provide in this instance a solenoid T, which is connected in series with one of the direct-current mains $a\ b$, as indicated. Within the influence of this solenoid is a core U of any suitable form connected by the link V with a lever-arm carried by the shaft D and shown in dotted lines at W.

In the operation of the system thus described the shunt field-winding S is supposed to have been adjusted, either by hand or otherwise, so as to insure that the currents flowing in the alternating-current system are lagging. If under these conditions the load on the direct-current system were to increase, its electromotive force would have a tendency to drop. This tendency is, however, counteracted by means of the inductance-varying device A, controlled by the solenoid T. The increase in current through the solenoid T due to increase of load increases the attraction upon the core U and causes a partial rotation of the member B against the combined resisting turning moment due to the reaction between the currents in the relatively movable members of the device A and to the downward pull produced by the weight F. When the short-circuited coils on the member B are thus brought into closer mutual inductive relation to the coils on the other member of the inductance-varying device, the immediate effect is an increase in the amount of current flowing in these short-circuited coils and a consequent reaction of the same upon the primary inducing-windings to set up lines of force in opposition to those produced by current in the primary windings, thus cutting down the self-induction of the latter windings. It will thus be seen that the inductance-varying device acts upon an increase in load on the system to cut down the inductive drop in the alternating-current lines and by consequence to increase the electromotive force at the receiving end of the alternating-current system. By suitable proportioning of parts the rise in electromotive force at the alternating-current terminals of the rotary converter may be made just sufficient to maintain a constant electromotive force at any selected point on the direct-current system. Ordinarily little attention need be paid to the field excitation of the converter, since the inductance in series with the alternating-current mains due to the action of the inductance device A is generally sufficient to produce the needed amount of lagging current required for the purpose of regulation. When the currents flowing in an alternating-current system are caused to be leading, as would be the case if the field of the rotary converter were overexcited, a reactance-varying device of somewhat-different nature is required. Where leading currents flow in a system containing inductance, the electromotive force at the receiving end of the line may be caused to vary with variation of either or both of these factors. Heretofore in the regulation of alternating-current systems by means of varying the field excitation of the rotary converter the action has been one in which the inductance of the line is maintained constant while the amount of leading current is varied. According to my present invention the field excitation of the rotary converter is normally not altered in response to variation of load, the regulation of the system by phase control being effected by suitably varying the reactance in the alternating-current system. In the present case, where leading currents are supposed to flow in the alternating-current system, increase in electromotive force at the receiving end of the line is secured by increasing the inductance of the transmission-lines. In Fig. 3 I have shown an automatically-actuated device for effecting this purpose. Unlike the arrangement shown in Fig. 1 this device requires no connection with the direct-current system, but, on the contrary, is actuated solely by the alternating currents flowing therein. In structure this device is similar in nature to a constant-current transformer of the type having relatively movable members. The only essential difference between this device and such a transformer is that the secondary coils are short-circuited upon themselves. The mode of action of this inductance-regulating device is the same as that of the constant-current transformer of the kind mentioned, and a detailed explanation of the action of the same is therefore unnecessary. It will suffice to say that one primary coil is placed in each of the alternating-supply mains and that as the current in these mains increases the short-circuited secondary coils move away from their corresponding primary coils, thus increasing the leakage flux between the two sets of coils and so increasing the inductance of the primary coils.

At 1 1 1 in Fig. 3 I have indicated the primary windings of a device of the character described. The short-circuited relatively movable secondary windings are shown at 2 2 2. The latter windings are carried by one end of a lever 3, to the other end of which is suspended a weight W'. The weight W' is attached to a cord 4 or other flexible connection, which passes over an adjustable eccentric winding-surface attached to the end of the lever 3 and acts to partially counterbalance the weight of the windings 2 2 2 and coöperating parts. The winding-surface is formed by suitably shaping a cam-like device 5, which device is pivoted at 6 to the end of the lever 3 and may be secured in position by means of a bolt passing through the slot 7 in the device. By varying the adjustment of this device the turning movement exerted by the weight W' about the axis of oscillation of the lever 3 may be caused to vary as the angular position of the lever varies, thus causing the inductance of the primary windings 1 1 1 of the inductance-varying device to vary within limits according to any desired law. In place of the device just described I may, if desired, produce a change in the inductance in the alternating-current system by means of solenoids placed in series with the respective lines and acting, respectively, upon relatively movable cores of magnetic material arranged to be normally urged out of or away from the solenoids by the action of a spring, gravity, or some other similar means. Such a device is indicated diagrammatically in Fig. 2 and consists of three coils 8 8 8, one of which is included in each of the three mains leading to the rotary converter and within the influence of each of which is located a normally retracted subdivided iron core. As shown in the drawings in Fig. 2, the cores 9 9 9 are carried, respectively, by arms 10 10 10, fixed to the shaft 11. A spring 12 or other suitable means acts to withdraw the cores 9 9 9 from their respective coils or solenoids when no current is flowing therein and to oppose the attraction due to current in the solenoids when current does flow. It will readily be understood that with increase of current in the solenoids the cores are more strongly attracted, and thus are drawn farther into the solenoid, and so increase the inductance of the alternating-current lines into which the solenoids are connected.

What I claim as new, and desire to secure by Letters Patent of the United States, is—

1. In a system of electrical distribution, the combination of alternating-current mains, a rotary converter connected thereto, an inductance device in series with the alternating-current mains, and means for automatically varying the inductance in the alternating-current mains with variation of load on the rotary converter.

2. The combination of a rotary converter, an alternating-current-supply system connected thereto, and automatically-actuated means for varying the reactance of said supply system, in response to variations of load on the rotary converter.

3. The combination of a rotary converter, an alternating-current system connected thereto, and automatically-actuated means dependent upon the load on the rotary converter for varying the inductance of said system.

4. The combination of a rotary converter, conductors connected thereto and carrying alternating currents, and means external to said rotary converter for varying the impedance in the circuit traversed by said alternating currents, the said means acting responsively to variation of load on the rotary converter.

In witness whereof I have hereunto set my hand this 25th day of March, 1902.

ERNST J. BERG.

Witnesses:
B. B. HULL,
HELEN ORFORD.